United States Patent Office 2,922,825
Patented Jan. 26, 1960

2,922,825
PROCESS FOR PREPARING CARBON TETRAFLUORIDE

William Channing Smith, Wilmington, Del., assignor to E. I. du Pont de Nemours and Company, Wilmington, Del., a corporation of Delaware No Drawing. Application November 27, 1957
Serial No. 699,158

6 Claims. (Cl. 260—653)

This invention relates to a new process for preparing compounds of fluorine and carbon, particularly carbon tetrafluoride.

Compounds containing fluorine and carbon, referred to as fluorocarbons, have achieved technical importance in many fields of applied chemicals. They are useful as propellent gases in aerosols and as intermediates for preparing other valuable fluorocarbons. Carbon tetrafluoride and hexafluoroethane are useful, for example, in synthesizing tetrafluoroethylene, as described in U.S. Patent 2,709,192.

Fluorocarbons have generally been synthesized heretofore by processes which require free fluorine alone or in combination with metal fluorides. Processes which use free fluorine are difficult to operate because of corrosion problems. Other methods of synthesizing fluorocarbons frequently require high temperatures, generally above 1000° C. Processes which employ high temperatures are costly to operate and can lead to the formation of considerable quantities of undesirable by-products. In many of the processes used heretofore, only a part of the fluorine used as a reactant appears in the fluorocarbons, the remaining fluorine being found in undesirable by-products.

In the present invention carbon disulfide is brought into contact with sulfur tetrafluoride at a temperature above about 225° C. to obtain carbon tetrafluoride as the principal reaction product. The ideal reaction of carbon disulfide and sulfur tetrafluoride is represented by the following equation in which all of the fluorine is found in the desired product, carbon tetrafluoride, and an easily separated by-product, sulfur, is obtained.

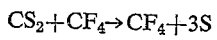

$$CS_2 + CF_4 \rightarrow CF_4 + 3S$$

The process of the invention, therefore, consists in reacting a mixture which is composed essentially of carbon disulfide and sulfur tetrafluoride.

In the actual operation of the process, there can be obtained small quantities of desirable fluorocarbons whose molecular weights are higher than carbon tetrafluoride, for example, hexafluoroethane and octafluoropropane. The process of the invention is economically advantageous since it gives good yields of desired fluorocarbons with minimum formation of undesired by-products. Commercial grade carbon disulfide can be used in the process and requires no special purification. Sulfur tetrafluoride can be obtained by processes described in the literature (Brown and Robinson, J. Chem. Soc. 1955, 3147–51).

The reaction of carbon disulfide with sulfur tetrafluoride is conducted under substantially anhydrous conditions, preferably in the absence of oxygen, in either a batch or continuous flow process. In either process the reaction chamber is preferably made of material resistant to chemical attack by hydrogen fluoride, for example, stainless steel or platinum. In a batch process, a vessel capable of withstanding pressure is preferably flushed with an inert gas, for example, nitrogen, to displace the air and is then charged with carbon disulfide. The pressure vessel is cooled, evacuated and sulfur tetrafluoride is then added to the cooled chamber. The vessel is sealed and the reaction conducted under predetermined conditions.

The most important variable in the process is the temperature which, for operability, should be above about 225° C. Small amounts of fluorocarbons are formed at 225° to 250° C. but substantially no carbon tetrafluoride or other fluorocarbons are formed at temperatures below about 225° C. At temperatures above about 250° C. improved yields of the desired products are obtained. A preferred temperature range, based on yield and economy of operation, lies between about 250° C. to 650° C. An especially preferred temperature range lies between about 350° C. and 550° C. Excessively high temperatures, for example, above about 900° C. are not necessary and provide little or no advantage in economy of operation or yields of desired products.

Heating of the reactants to the desired temperature may be accomplished by a stepwise procedure wherein the reactants are maintained for short periods of time at progressively higher temperatures. This procedure permits smooth operation of the process and avoids sudden increases in pressure in the reaction vessel. However, this procedure is not essential for operability. The reactants can, if desired, be heated in one step to the reaction temperature. The reaction time is not critical. Generally, in a batch process the materials are permitted to react from about 2 hours to about 48 hours.

For satisfactory operation of the process, the molar ratio of carbon disulfide to sulfur tetrafluoride ($CS_2/SF_4$) will lie between about 0.1 and 10.0. The preferred molar ratio of $CS_2/SF_4$ lies between about 0.25 and 4.0. Exact control of the molar ratios is not necessary in the process since unreacted materials can be recovered and used again. An excess of carbon disulfide can be employed, if desired to assure maximum utilization of the more expensive sulfur tetrafluoride.

The pressure employed in a batch process is not critical and is generally autogenous. Generally, it will lie between about 5 atmospheres and 50 atmospheres. Higher pressures are not detrimental. The variables of pressure, temperature and time are interdependent and can be adjusted to obtain maximum yields of fluorocarbons. During the reaction period the contents of the reaction vessel are preferably mixed, for example, by mechanical stirring or shaking.

The reaction can be carried out advantageously in the presence of a minor amount of one or more fluoride ion acceptors. Examples of fluoride ion acceptors useful in this reaction are hydrogen fluoride, boron trifluoride, arsenic trifluoride, phosphorus pentafluoride, titanium tetrafluoride and silicon tetrafluoride. Only small amounts of these compounds are used, for example, from about 0.1 to about 10.0% by weight of the sulfur tetrafluoride. Use of a small quantity of a fluoride ion acceptor can result in improved yields of fluorocarbons and reduce the length of time and the temperature employed in the reaction.

The process of the invention can also be conducted by a continuous flow method wherein the carbon disulfide and sulfurtetrafluoride are individually passed into a reaction tube which is heated to the desired temperature to effect reaction. Generally, higher temperatures are needed in a continuous flow process than in a batch process since the former process is normally conducted at atmospheric pressure with short reaction times.

The volatile products of the reaction are collected in corrosion-resistant vessels which are cooled to a low temperature with, for example, liquid nitrogen or liquid helium. The volatile products can be purified by conventional methods such as low temperature fractional distillation.

The following examples, in which quantities are expressed as parts by weight, illustrate the process of the invention.

Example I

A bomb (capacity, 145 parts of water), lined with "Hastelloy" is flushed with nitrogen and charged with 63 parts of carbon disulfide. The charged bomb is cooled in a solid carbon dioxide-acetone mixture and evacuated to about 2 mm. pressure. It is then charged with 44 parts of sulfur tetrafluoride. The mole ratio, $CS_2/SF_4$, is approximately 1/0.48. The bomb is closed and heated at 100° C. for 2 hours and 250° C. for 6 hours under autogenous pressure. After cooling to room temperature, the bomb is opened and the volatile products are collected in a stainless steel cylinder which is cooled in liquid nitrogen. There is obtained 41 parts of gaseous products which, as shown by mass spectrographic analysis, contain 0.2–0.5 mole percent of carbon tetrafluoride.

The "Hastelloy" of this specification is "Hastelloy" C, a well-known chemically-resistant alloy of nickel, iron and molybdenum.

Example II

Using the bomb and process described in Example I, a mixture of 25 parts of carbon disulfide and 40 parts of sulfur tetrafluoride is heated for 1 hour at 200° C., 3 hours at 300° C., 2 hours at 400° C. and 4 hours at 440° C. The mole ratio, $CS_2/SF_4$, is approximately 1/1.12. After cooling to room temperature, the bomb is opened and the volatile products are collected in a stainless steel cylinder which is cooled in liquid nitrogen. There is obtained 6 parts of volatile products which contain, as shown by mass spectrographic analysis, about 62–69 mole percent of carbon tetrafluoride. There is present also small quantities of hexafluoroethane (about 0.3 mole percent) and trifluoromethyl sulfides of the general formula $CF_3(S)_nCF_3$ where the value of $n$ is 1, 2 and 3.

There remains in the bomb 40 parts of a solid which, upon extraction with carbon disulfide, yields approximately 33 parts of sulfur.

Examples I and II illustrate the operation of the process of the invention in the absence of a fluoride ion acceptor. Examples III and IV which follow illustrate the use of a small quantity of a fluoride ion acceptor in the process and the improved yields of carbon tetrafluoride obtained thereby.

Example III

Using the procedure described in Example I, a mixture of 25 parts of carbon disulfide, 2 parts of arsenic trifluoride and 37 parts of sulfur tetrafluoride is reacted for 2 hours at 200° C., 3 hours at 300° C., 2 hours at 400° C. and 4.5 hours at 440° C. The mole ratio, $CS_2/SF_4$, is approximately 1/1. There is obtained 18 parts of volatile products which, as shown by mass spectrographic analysis, contain about 89–91 mole percent of carbon tetrafluoride and small amounts of higher fluorocarbons, for example, 0.1–0.2 mole percent of hexafluoroethane and about 0.5 mole percent of octafluoropropane.

There remains in the bomb 29.5 parts of a yellow solid of which 27.2 parts is extracted as free sulfur with carbon disulfide.

Example IV

Using the procedure described in Example I, a mixture of 20 parts of carbon disulfide, 2 parts of arsenic trifluoride and 60 parts of sulfur tetrafluoride are heated for 2 hours at 200° C., 3 hours at 300° C., 4 hours at 400° C. and 3.5 hours at 476–479° C. The mole ratio, $CS_2/SF_4$, is approximately 1/2.12. After cooling to room temperature, the bomb is opened and the volatile products are collected in a stainless steel cylinder which is cooled in liquid nitrogen. There is obtained 48 parts of volatile products which, as shown by mass spectrographic analysis, contain approximately 54–56 mole percent (50 weight percent) of carbon tetrafluoride and 0.1–0.3 mole percent of hexa-fluoroethane. The weight yield of carbon tetrafluoride based on the carbon disulfide is essentially quantitative.

As shown by the examples, the principal reaction product is carbon tetrafluoride. Other fluorocarbons which are formed in lesser amounts generally are saturated fluorocarbons which contain two or three carbon atoms. Higher fluorocarbons can also be formed in still lesser amounts.

I claim:
1. A process for preparing carbon tetrafluoride comprising reacting carbon disulfide with sulfur tetrafluoride at a temperature between about 225° C. and 900° C.
2. The process of claim 1 wherein the temperature for reaction lies between about 250° C.–650° C.
3. The process of claim 1 carried out in the presence of a small quantity of at least one fluoride ion acceptor of the group consisting of hydrogen fluoride, boron trifluoride, arsenic trifluoride, phosphorus pentafluoride, titanium tetrafluoride and silicon tetrafluoride.
4. A process for preparing carbon tetrafluoride by reaction of carbon disulfide and sulfur tetrafluoride which comprises contacting carbon disulfide with sulfur tetrafluoride in the molar ratio of between about 0.1 and 10.0, at a temperature between about 225° C. and 900° C.
5. The process of claim 4 wherein the reaction temperature lies between about 250° C. and 650° C.
6. The process of claim 4 carried out in the presence of a small quantity of at least one fluoride ion acceptor of the group consisting of hydrogen fluoride, boron trifluoride, arsenic trifluoride, phosphorus pentafluoride, titanium tetrafluoride and silicon tetrafluoride.

References Cited in the file of this patent

UNITED STATES PATENTS

| | | |
|---|---|---|
| 2,104,695 | Gleave | Jan. 4, 1938 |
| 2,709,186 | Farlow et al. | May 24, 1955 |

FOREIGN PATENTS

| | | |
|---|---|---|
| 454,577 | Great Britain | Oct. 2, 1936 |

UNITED STATES PATENT OFFICE

CERTIFICATE OF CORRECTION

Patent No. 2,922,825             January 26, 1960

William Channing Smith

It is hereby certified that error appears in the printed specification of the above numbered patent requiring correction and that the said Letters Patent should read as corrected below.

Column 1, line 47, the equation should appear as shown below instead of as in the patent:

$$CS_2 + SF_4 \longrightarrow CF_4 + 3S$$

column 2, line 14, for "to" read -- and --.

Signed and sealed this 23rd day of August 1960.

(SEAL)
Attest:

KARL H. AXLINE
Attesting Officer

ROBERT C. WATSON
Commissioner of Patents